US009444231B2

United States Patent
Ho et al.

(10) Patent No.: US 9,444,231 B2
(45) Date of Patent: Sep. 13, 2016

(54) MOUNTING MECHANISM

(71) Applicants: LITE-ON ELECTRONICS (GUANGZHOU) LIMITED, Guangzhou (CN); LITE-ON TECHNOLOGY CORPORATION, Taipei (TW)

(72) Inventors: Chun-Lung Ho, Hsinchu County (TW); Yi-Hsun Lee, Taoyuan County (TW); Ming-Wei Ou, Taipei (TW); Yuan-Fu Lin, New Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 14/669,060

(22) Filed: Mar. 26, 2015

(65) Prior Publication Data

US 2016/0021776 A1    Jan. 21, 2016

(30) Foreign Application Priority Data

Jul. 16, 2014    (CN) ...................... 2014 2 0394022 U

(51) Int. Cl.
*H02B 1/52* (2006.01)
*H02B 1/052* (2006.01)

(52) U.S. Cl.
CPC ............... *H02B 1/0523* (2013.01); *H02B 1/52* (2013.01)

(58) Field of Classification Search
CPC ........ H02B 1/00; H02B 1/015; H02B 1/052; H02B 1/56; H02B 1/0523; H01R 9/24; H01R 9/26; H01R 13/60; A47B 96/06
USPC ......... 248/214, 225.21, 298.1, 694; 439/716, 439/717, 532; 361/673
See application file for complete search history.

(56) References Cited

U.S. PATENT DOCUMENTS

| | | | | | |
|---|---|---|---|---|---|
| 4,698,726 | A | * | 10/1987 | Ootsuka | H02B 1/052 335/132 |
| 4,947,290 | A | * | 8/1990 | Ootsuka | H02B 1/052 248/222.13 |
| 5,904,592 | A | * | 5/1999 | Baran | H02B 1/052 361/627 |
| 6,172,875 | B1 | * | 1/2001 | Suzuki | G06F 1/183 361/679.4 |
| 6,563,697 | B1 | * | 5/2003 | Simbeck | H02B 1/052 200/295 |
| 6,851,985 | B2 | * | 2/2005 | Lafragette | H02B 1/26 439/701 |
| 7,059,898 | B2 | * | 6/2006 | Barile | H02B 1/052 439/532 |
| 7,374,453 | B1 | * | 5/2008 | Allcock | B66C 7/08 439/532 |

(Continued)

*Primary Examiner* — Jonathan Liu
*Assistant Examiner* — Muhammad Ijaz
(74) *Attorney, Agent, or Firm* — Li & Cai Intellectual Property (USA) Office

(57) ABSTRACT

A mounting mechanism for gripping DIN rail comprises: a main body and a latching body. The main body includes a first mounting portion having a stopper member and at least one first retaining unit, and a second mounting portion. The latching portion is movably disposed in the first mounting portion and includes at least one resilient portion and at least one second retaining unit. When one end of the latching body protrudes into the second mounting portion, the range of movement of the latching body spans from a position wherein the resilient portion abuts the stopper member to a position in wherein the second retaining unit abuts the first retaining unit. The main body is movably latched onto the DIN rail through the second mounting portion, and is fixed to a position on the DIN rail through one end of the latching body protruding into the second mounting portion.

11 Claims, 13 Drawing Sheets

(56) References Cited

U.S. PATENT DOCUMENTS

| | | | | |
|---|---|---|---|---|
| 7,516,927 B2* | 4/2009 | Portal | ............... | H01R 9/2608 248/221.11 |
| 7,674,129 B1* | 3/2010 | Liu | ............... | H02B 1/052 361/807 |
| 2010/0203774 A1* | 8/2010 | Lanning | ............... | H01R 25/145 439/716 |
| 2010/0255713 A1* | 10/2010 | Peng | ............... | H02B 1/052 439/532 |
| 2011/0269339 A1* | 11/2011 | Baran | ............... | H05K 7/1474 439/532 |

* cited by examiner

US 9,444,231 B2

MOUNTING MECHANISM

BACKGROUND OF THE INVENTION

1. Field of the Invention

The invention relates to a mounting mechanism for fixing a control equipment in a housing, more particularly to a mounting mechanism that permits quick positioning and easy removal of many control equipments.

2. Description of Related Art

Typical industrial control equipment has DIN rails disposed inside a housing. Control equipment (e.g. a converter) is fixed on the DIN rails. The voltage is changed by changing the frequency of the power source according to practical needs, thereby saving energy. Additionally, with the increase of industrial automation, control equipment (e.g. converter) is widely in use in the market. A typical fastening method uses a plurality of fastening units, such as screws, to fasten an electronic device onto a DIN rail inside the housing. However, given that automation equipment is trending toward being compact, energy-saving, aesthetical, and convenient, the housing of the control equipment can only occupy a limited amount of space in the automation equipment. Installing control equipment in a narrow space has a certain degree of difficulty, especially when the electronic device is fastened by screws, the user cannot quickly and conveniently remove or fasten the electronic device onto the DIN rail. Also, the housing must have fastening holes for screws, affecting the usage space inside the housing. When multiple control equipment is to be installed inside the housing, the difficulty of the installation is increased and the control equipment cannot be utilized effectively, thus the equipment cannot be compact or miniaturized.

SUMMARY OF THE INVENTION

The object of the present disclosure is to provide a mounting mechanism which is convenient to install, can be assembled quickly, and not limited by the amount of space for installation. In a housing having the same volume, multiple control equipment can be installed, making the equipment compact and miniaturized.

In order to achieve the aforementioned objects, the present disclosure provides a mounting mechanism for gripping a DIN rail, comprising: a main body and a latching body. The main body includes a first mounting portion and a second mounting portion. The first mounting portion has a stopper member and at least one first retaining unit. The latching body is movably disposed at the first mounting portion and includes at least one resilient portion and at least one second retaining unit. When one end of the stopper member protrudes to the second mounting portion, the motion of the latching body in the first mounting portion is restricted by the position of abutment between the resilient portion and the stopper member, and the position of abutment between the second retaining unit and the first retaining unit. The main body can movably grip the DIN rail through the second mounting portion, and can be fixed at a position on the DIN rail by the protrusion of one end of the latching body into the second mounting portion.

The present disclosure has the following advantages. Through the interaction between the resilient portion of the latching body and the stopper member of the first mounting portion of the main body, the main body can be quickly fixed on the DIN rail. Through simple operation of the latching body, the main body can be quickly removed from the DIN rail.

In order to further the understanding regarding the present disclosure, the following embodiments are provided along with illustrations to facilitate the disclosure of the present disclosure.

DETAILED DESCRIPTION OF THE PREFERRED EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

Figure 1:
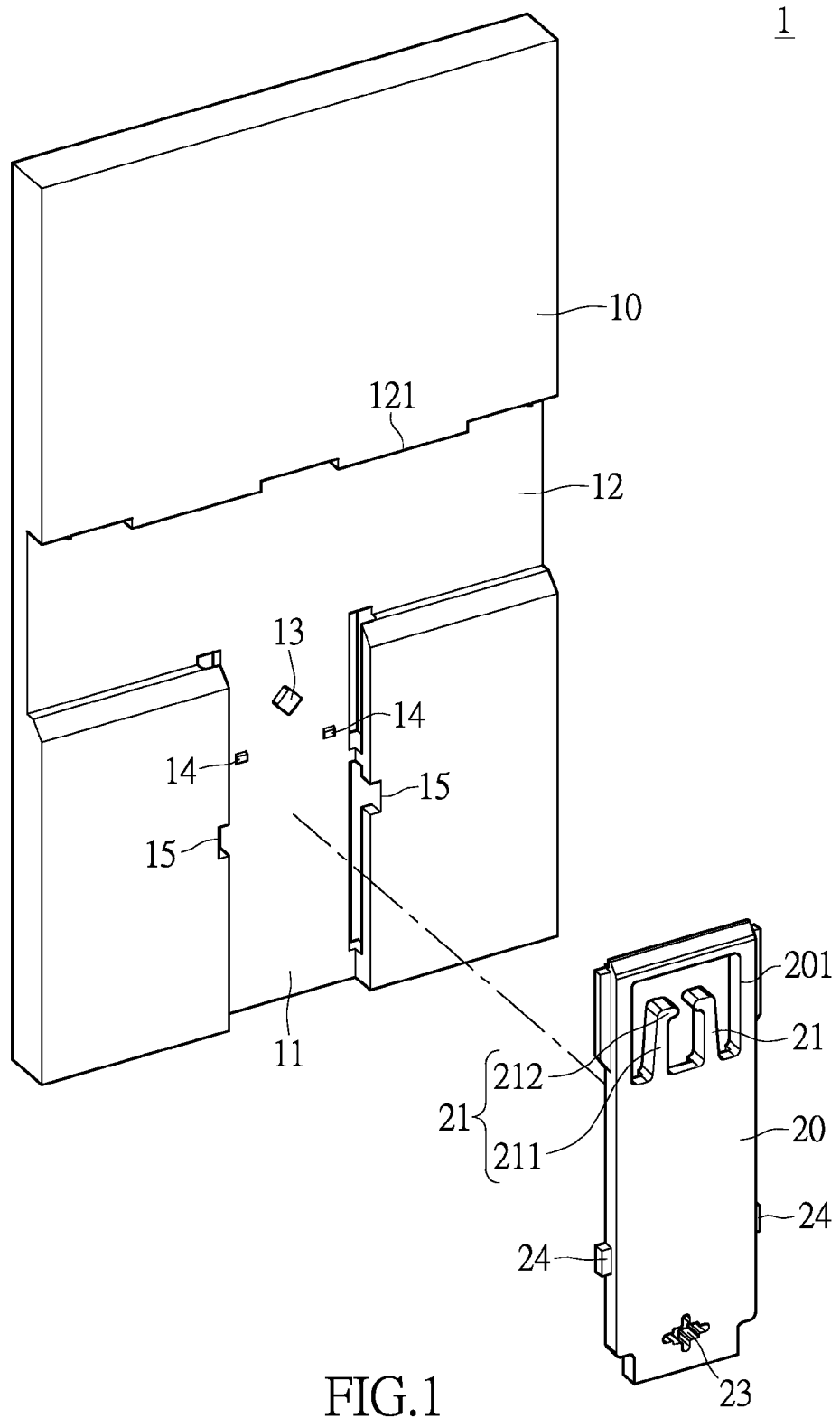
FIG. 1 shows an exploded view of a mounting mechanism according to the present disclosure.
Figure 2:
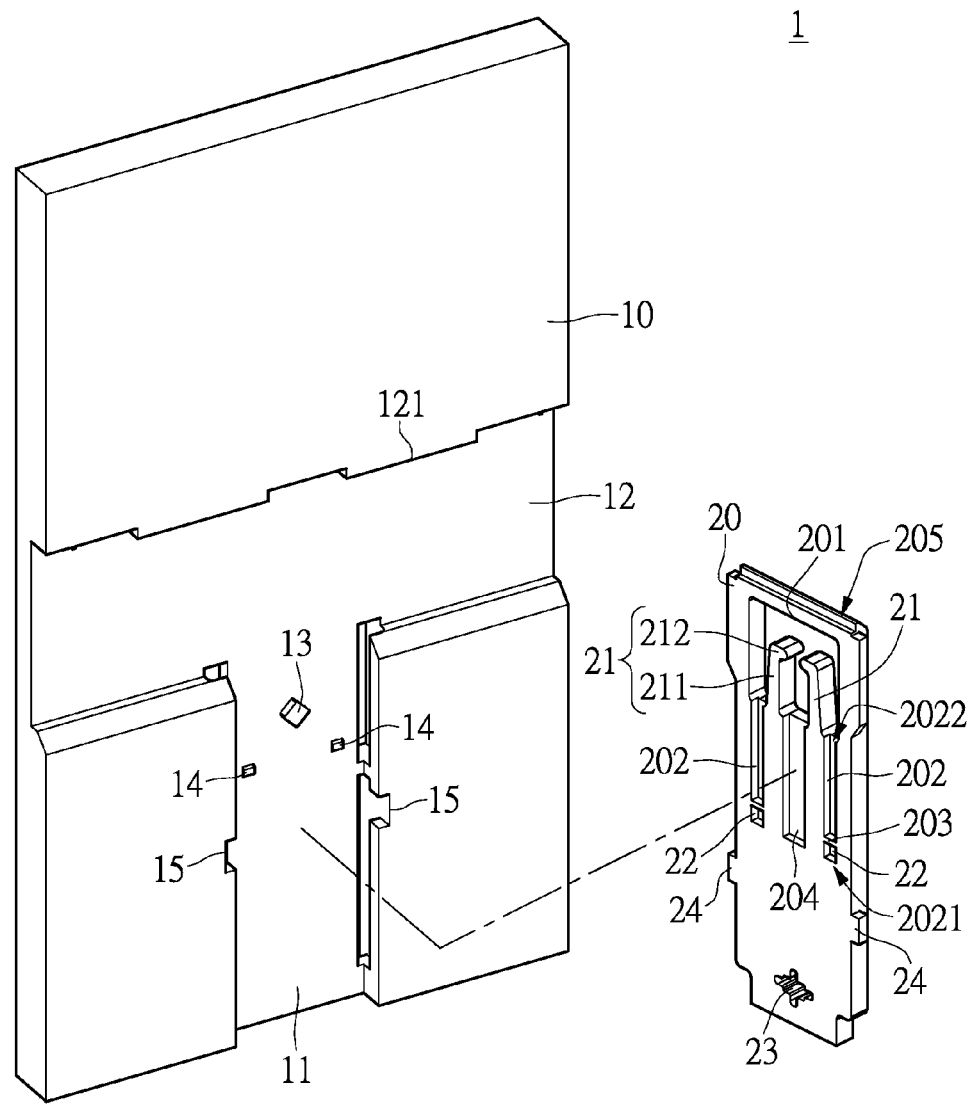
FIG. 2 shows an exploded view of a mounting mechanism according to the present disclosure from another perspective.

FIG. 1 and FIG. 2 show exploded views of a mounting mechanism 1 according to the present disclosure from different perspectives. The mounting mechanism 1 comprises: a main body 10 and a latching body 20. The main body 10 includes a first mounting portion 11 and a second mounting portion 12. One end of the first mounting portion 11 communicates with the second mounting portion 12. Preferably, the center lines of the first mounting portion 11 and the second mounting portion 12 are perpendicular. A stopper member 13 and at least one first retaining unit 14 are disposed in the first mounting portion 11. The stopper member 13 is more proximal to the second mounting portion 12 than the first retaining unit 14 is.

In the present embodiment, the stopper member 13 and the retaining unit 14 can protrude from the surface of the first mounting portion 11, for example by being integrated as one body therewith. Of course, the stopper member 13 and the first retaining unit 14 can also be recesses. Preferably, the first mounting portion 11 has two first retaining units 14 arranged symmetrically, and the stopper member 13 lies on the line of symmetry of the two first retaining units 14 and is more proximal to the second mounting portion 12. The appearance and quantity of the first retaining units 14 can be selected according to need. For example, the first mounting portion 11 has only one first retaining unit 14. Additionally, the shape of the stopper member 13 is likewise not limited to those shown in the figures, and can be a polygonal shape conforming to a shape of an resilient portion 21. Likewise, the shape of the first retaining unit 14 is not limited to those shown in the figures, and can conform to a shape of a second retaining unit 22.

The width and structure of the second mounting portion 12 are configured to conform to a DIN rail, such that the main body 10 can movably grip the DIN rail. The present disclosure does not describe in detail the dimensions of the DIN rail, which is conventional knowledge. Additionally, in practice, the side of the second mounting portion 12 opposite the side communicating to the first mounting portion 11 can be formed with at least one fixing member 121, for restraining the DIN rail from detaching from the second mounting portion 12 when accommodated therein. Of course, the position, quantity and shape of the fixing member 121 is not limited to that shown in the figures.

The latching body 20 is movably disposed in the first mounting portion 11 and includes an resilient portion 21 and at least one second retaining unit 22. The shape and quantity of the resilient portion 21 can be designed according to need. In the present embodiment, one end of the latching body 20 is formed with a through hole 201. Two resilient portions 21 extend from an inner wall of the through hole 201 into the through hole 201. Each of the resilient portions 21 is formed by an resilient arm 211 and a hook-engaging portion 212. Each one of the resilient arms 211 is connected to the latching body 20 at one end, and connected to the respective hook-engaging portion 212 at the other end. The appearance of the hook-engaging portion 212 can be designed according to the shape of the stopper member 13, and is not limited thereby. Preferably, the hook-engaging portion 212 curves toward the center line of the latching body 20, for abutting the stopper member 13 of the first mounting portion 11.

The second retaining unit 22 can be disposed on the surface of the latching body 20 facing the first mounting portion 11, and has a shape corresponding to that of the first retaining unit 14. In the present embodiment, the first retaining unit 14 protrudes from the first latching body 11, and the second retaining unit 22 is a recess. Furthermore, a first guiding groove 202 is formed on the surface of the latching body 20 corresponding to each of the first retaining units 14. One end of each of the first guiding grooves 202 communicates with the through hole 201. The other end of each of the first guiding grooves 202 is a closed end 2021. A stopper wall 203 is formed at each of the first guiding grooves 202 proximal to the respective closed end 2021. Thereby, each of the recessed second retaining units 22 is formed between the respective closed end 2021 and the respective stopper wall 203. Of course, in other embodiments, the first retaining units 14 can be recessed, and the second retaining units 22 can be protrusions or other corresponding forms. Additionally, in the present embodiment, a second guiding groove 204, corresponding to the stopper member 13 protruding on the first mounting portion 11, can be formed on the latching body 20. When the latching body 20 is disposed in the first mounting portion 11, the second guiding groove 204 accommodates the stopper member 13, and the stopper member 13 is free to slide in the second guiding groove 204.

Of particular note, in the present embodiment, two opposite lateral walls of the first mounting portion 11 can each be formed with a first assembly unit 15 which is an indentation. Two opposite lateral sides of the latching body 20 can each be formed with a second assembly unit 24 which extends outward. Additionally, one end of the latching body 20 can be formed with an operation hole 23. Preferably, the inner wall of the operation hole 23 has a polygonal shape.

Figure 3:
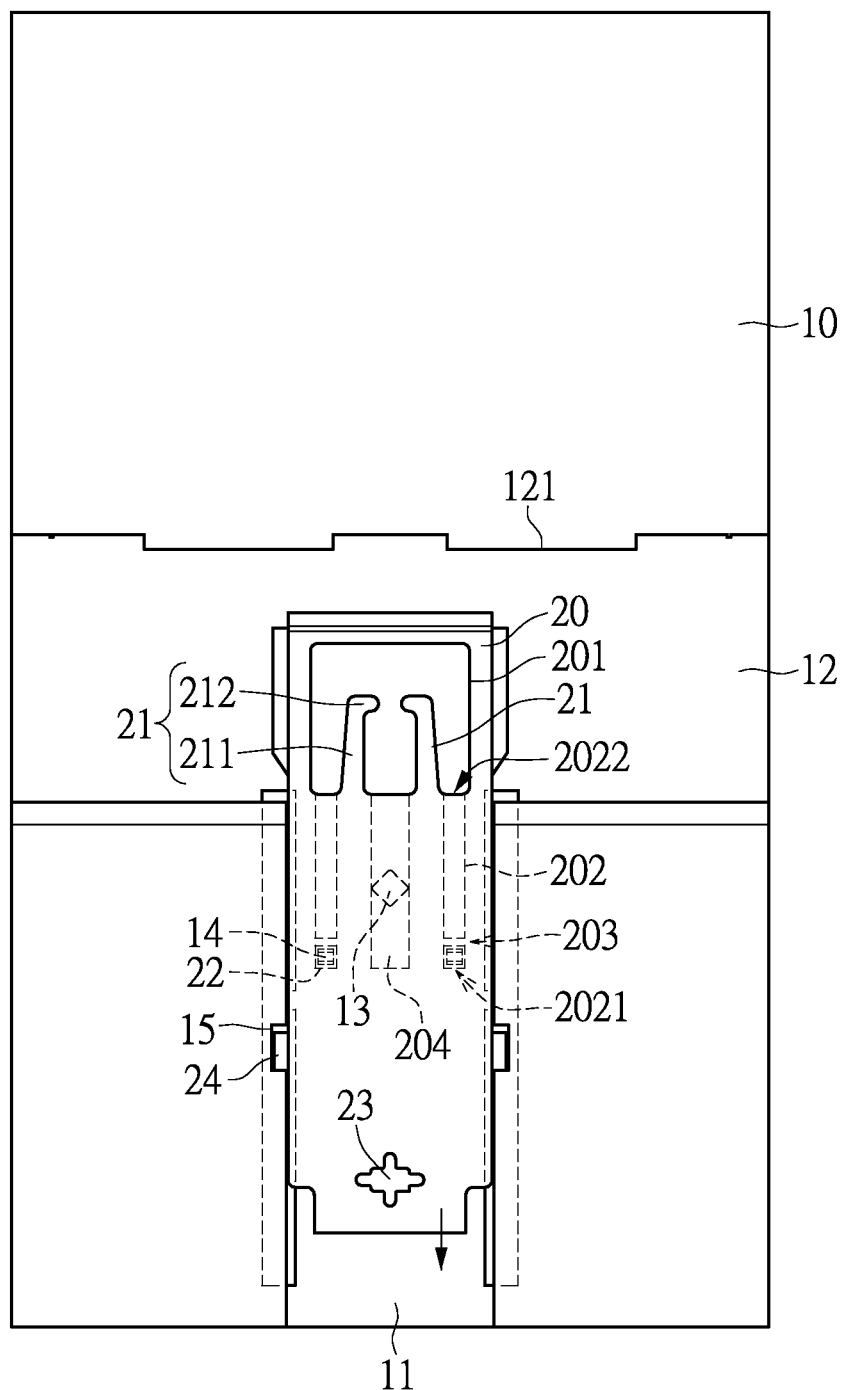
FIG. 3 shows a top view of a second assembly unit of a latching body engaged to a first assembly unit of a first mounting portion according to the present disclosure.
Figure 4:
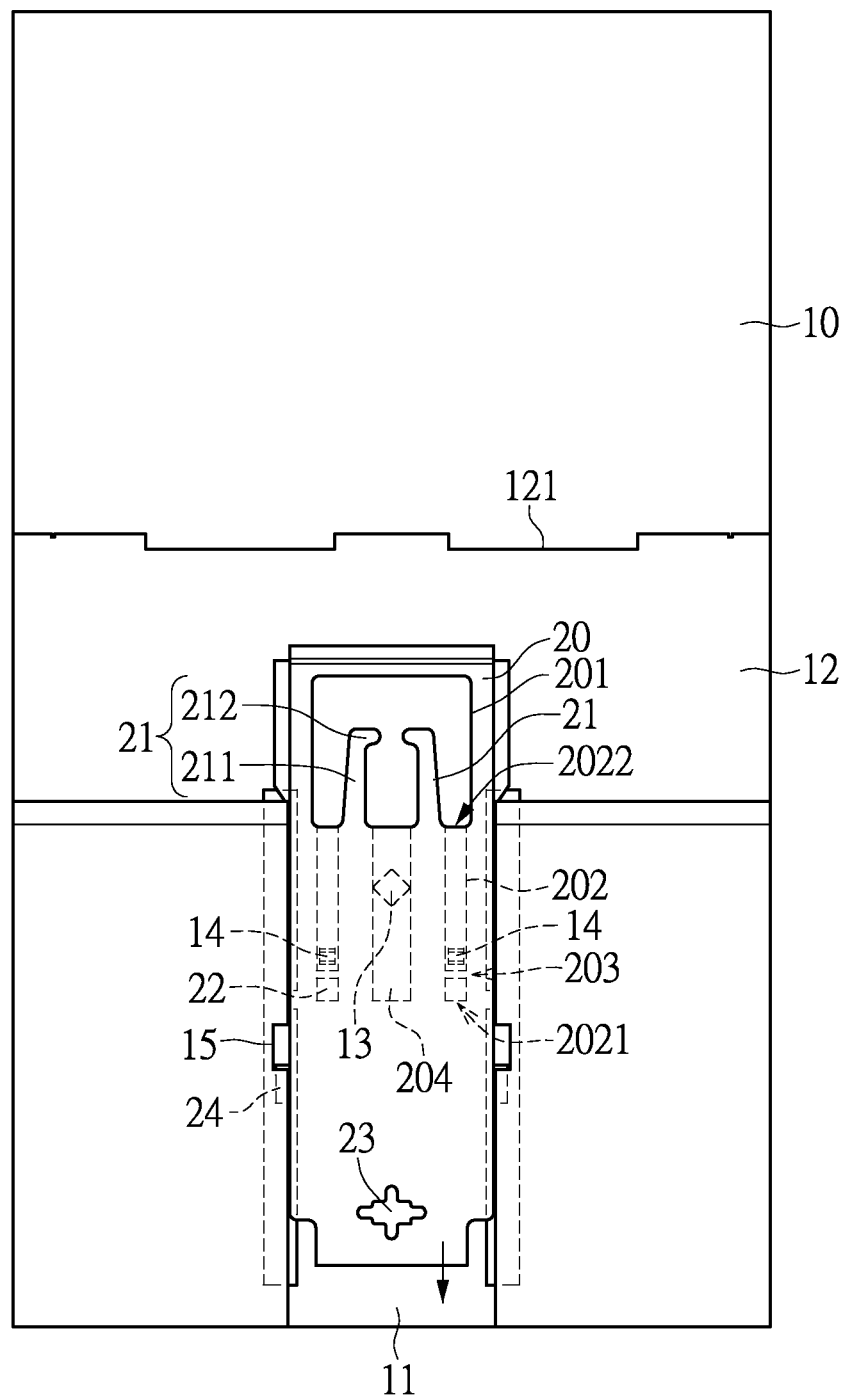
FIG. 4 shows a top view of a first retaining unit of the first mounting portion disposed at a first guiding groove of a latching body according to mounting mechanism of the present disclosure.

FIG. 3 to FIG. 6 show the assembly of the latching body 20 to the main body 10. As shown in FIG. 3, first, the two second assembly units 24 protruding from two lateral sides of the latching body 20 are placed respectively into the two first assembly units 15 indented from two lateral sides of the first mounting portion 11, and each of the second retaining units 22 sleeves the respective first retaining unit 14. Namely, each of the two first retaining units 14 is restricted between the closed end 2021 and the stopper wall 203 of the respective first guiding groove 202. Next, as shown in FIG. 4, the latching body 20 is moved downward (in the direction indicated by the arrow), such that each of the first retaining units 14 passes over the respective stopper wall 203 and becomes accommodated in the respective first guiding groove 202 and can freely slide therein.

Figure 5:
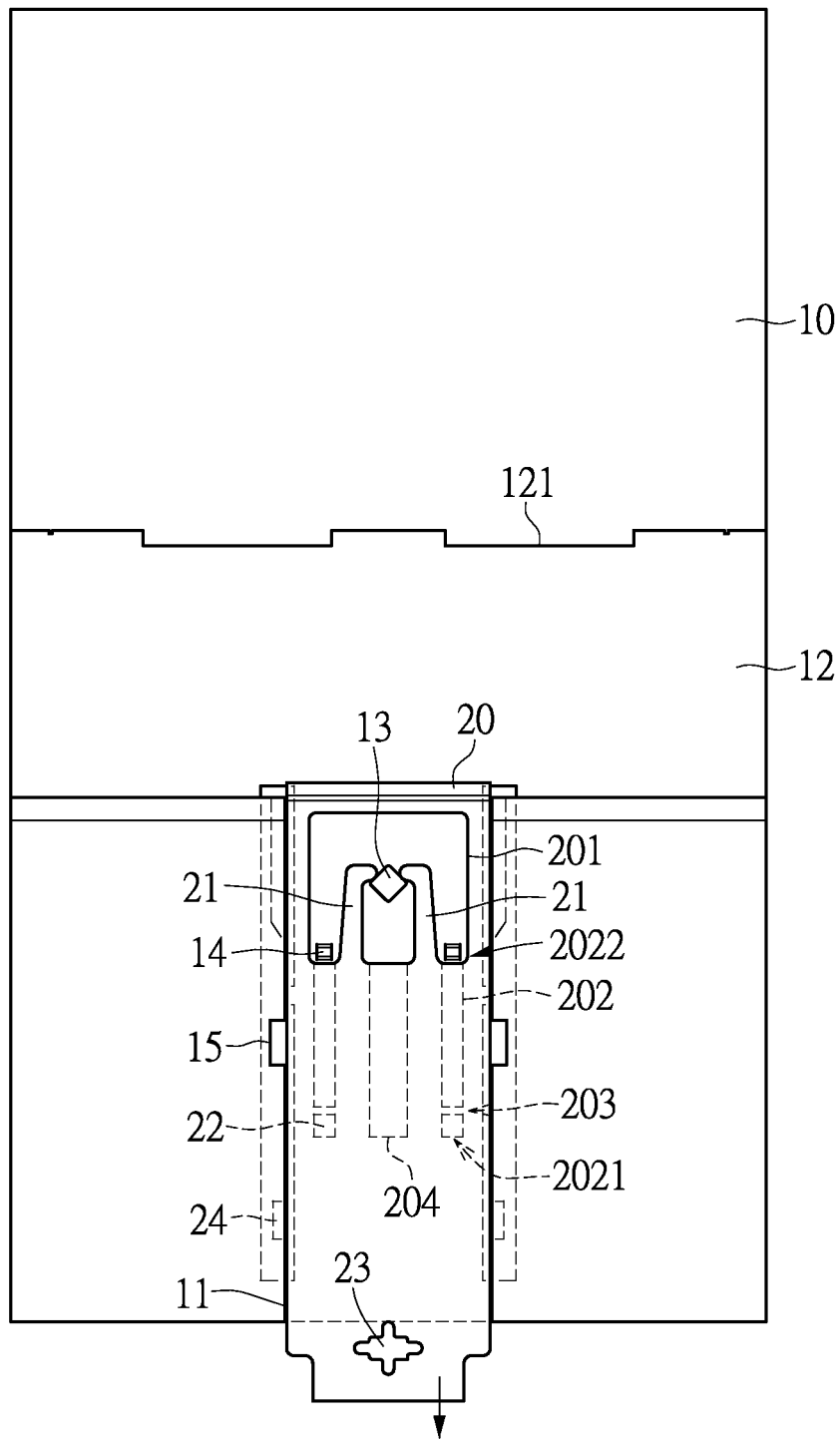
FIG. 5 shows a top view of a latching body disposed at a first mounting portion and having one end protruding into a second mounting portion according to a mounting mechanism of the present disclosure.
Figure 6:
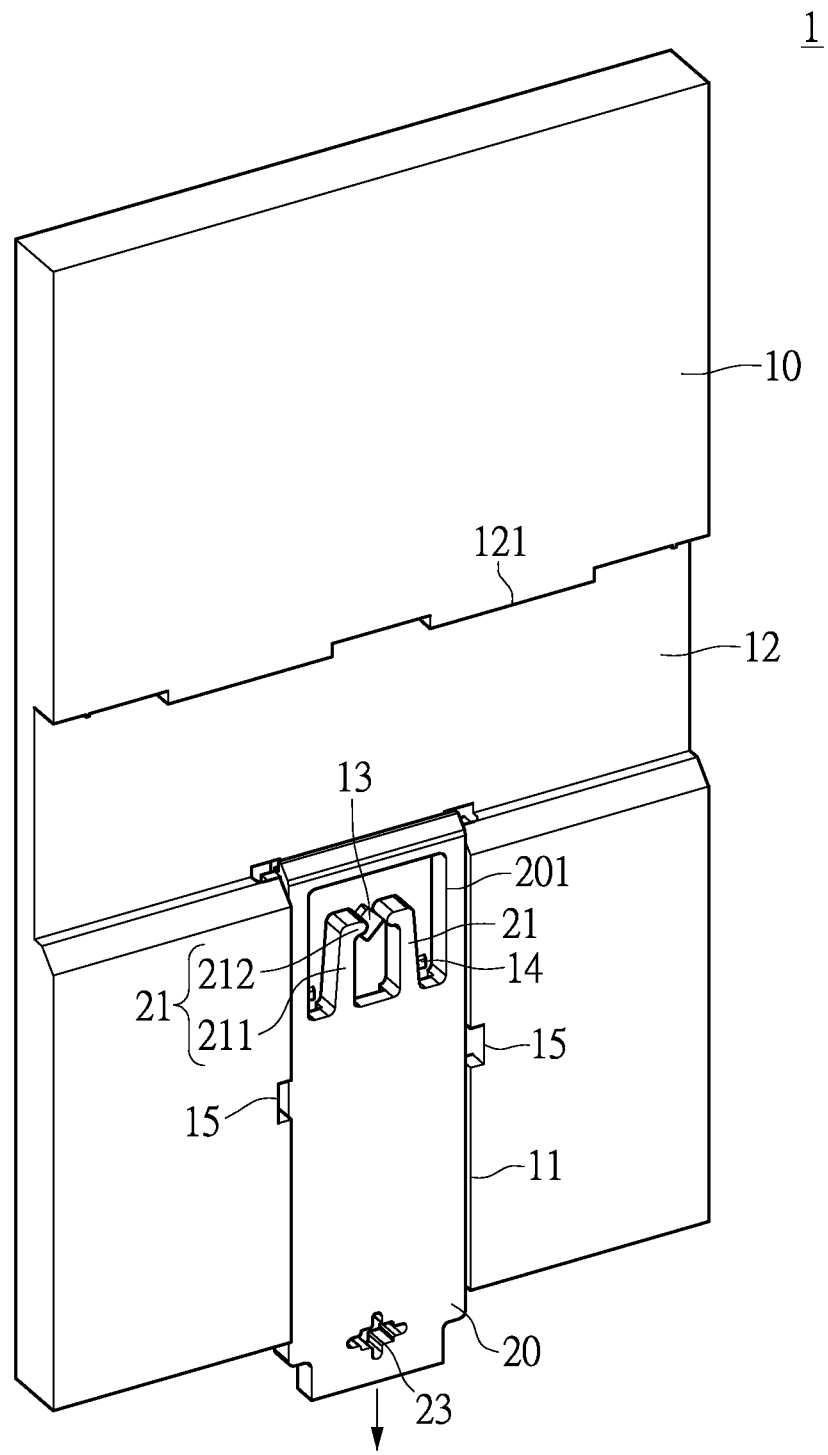
FIG. 6 shows a perspective view of a latching body disposed at a first mounting portion and having one end protruding into a second mounting portion according to a mounting mechanism of the present disclosure.

As shown in FIG. 5 and FIG. 6, when each of the first retaining units 14 slides along and out of the respective first guiding groove 202, the first retaining unit 14 is exposed in the through hole 201 of the latching body 20, and the hook-engaging portion 212 of each of the resilient portions 21 abuts a side of the stopper member 13 facing the second mounting portion 12, for restricting the latching body 20 from moving downward along the first mounting portion 11. In other words, as in FIG. 4 to FIG. 6, when the first retaining units 14 are accommodated in the respective first guiding grooves 202, on the side of the stopper walls 203 away from the second retaining units 22 (recesses), the range of motion of the latching body 20 in the first mounting portion 11 spans from a position wherein the first retaining units 14 abuts the respective stopper walls 203, to a position wherein the stopper member 13 abut the resilient portion 21. FIG. 6 is a perspective view of FIG. 5. Of particular note, when the hook-engaging portions 212 of the resilient portions 21 abut the stopper member 13, one end of the latching body 20 protrudes into the second mounting portion 12, and the operation hole 23 at the other end of the latching body 20 is exposed outside the main body 10 (outside the first mounting portion 11).

Figure 7:
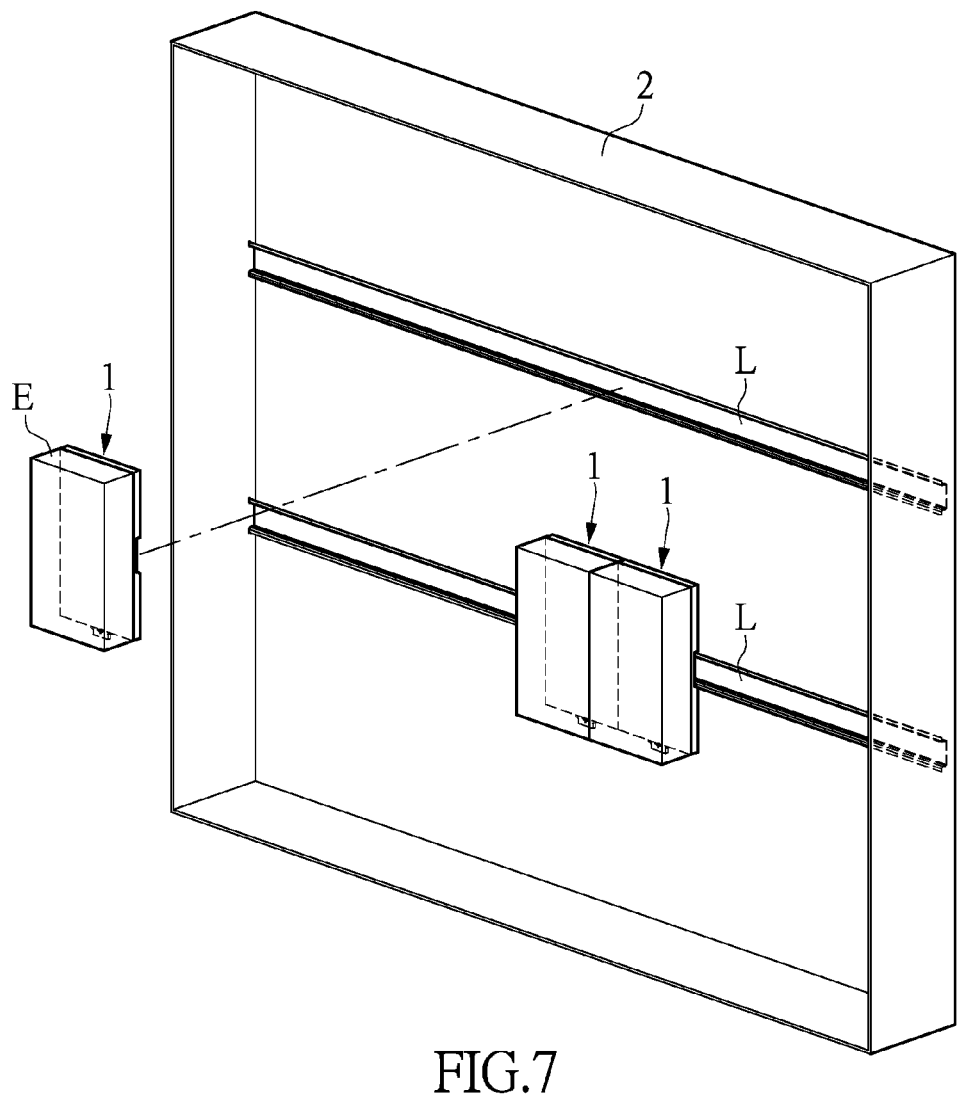
FIG. 7 shows a perspective view of a mounting mechanism applied in a housing according to the present disclosure.

FIG. 7 to FIG. 13 show the application of the mounting mechanism 1 of the present disclosure in a housing 2. As shown in the figures, a plurality of DIN rails L can be disposed inside the housing 2, and a plurality of control equipment E each held by one of the mounting mechanisms 1 can be disposed on the DIN rails L. The control equipment E can be for example current stabilizers, voltage stabilizers, transformers, etc. and can be selected according to need. In another embodiment, the mounting mechanisms 1 can directly be casings of the control equipment E and are not limited to the forms shown in the figures. Additionally, the dimensions, appearance and the size of the control equipment E to the housing as shown in FIG. 7 are of only one implementation, and are not limited thereto in practice. The quantity and distance of arrangement interval of the DIN rails L disposed in the housing 2 can be determined in practice according to the size of the control equipment E and amount of space required to operate the control equipment E.

Figure 8:
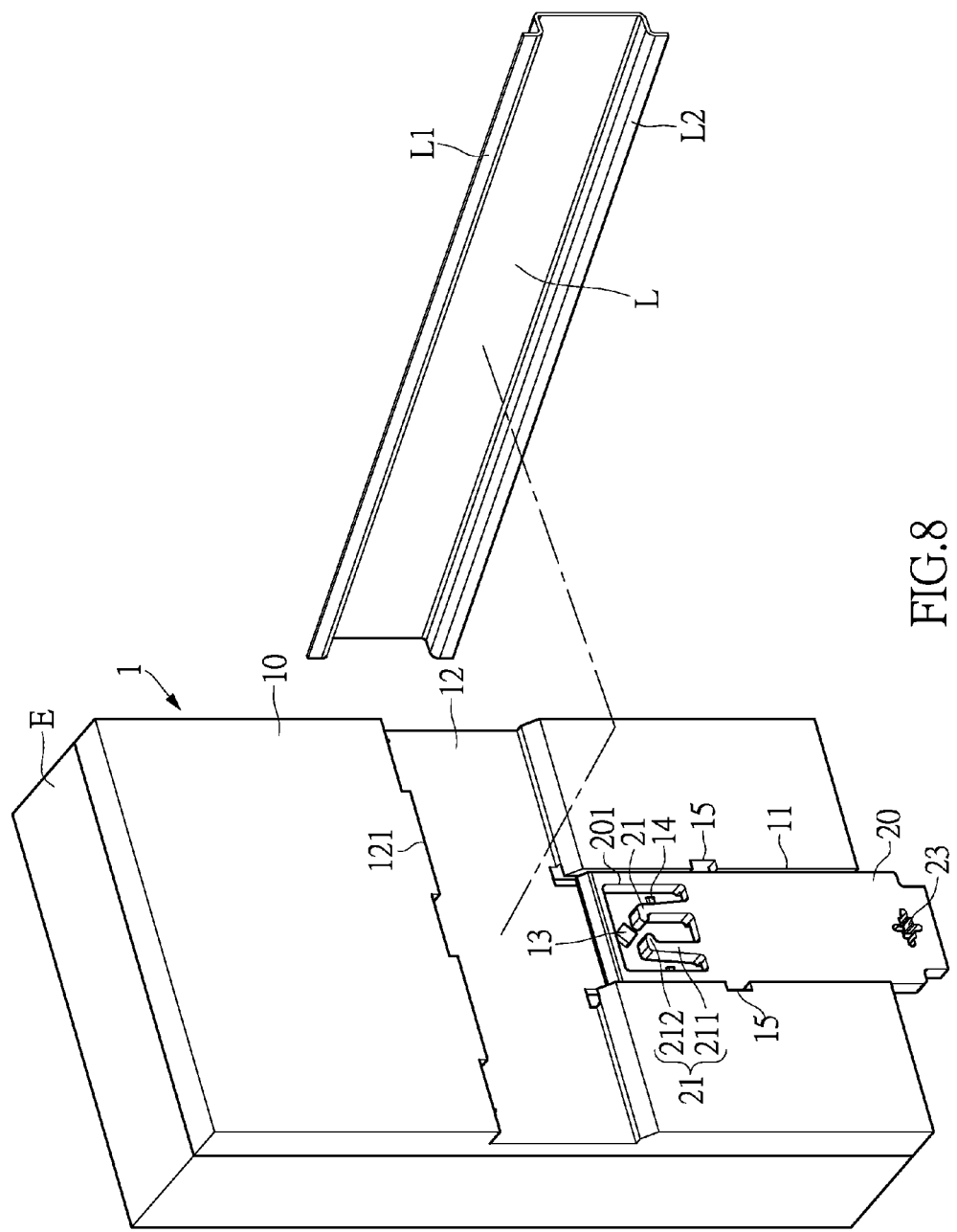
FIG. 8 shows an exploded view of a mounting mechanism and a rail in a housing according to the present disclosure.
Figure 9:
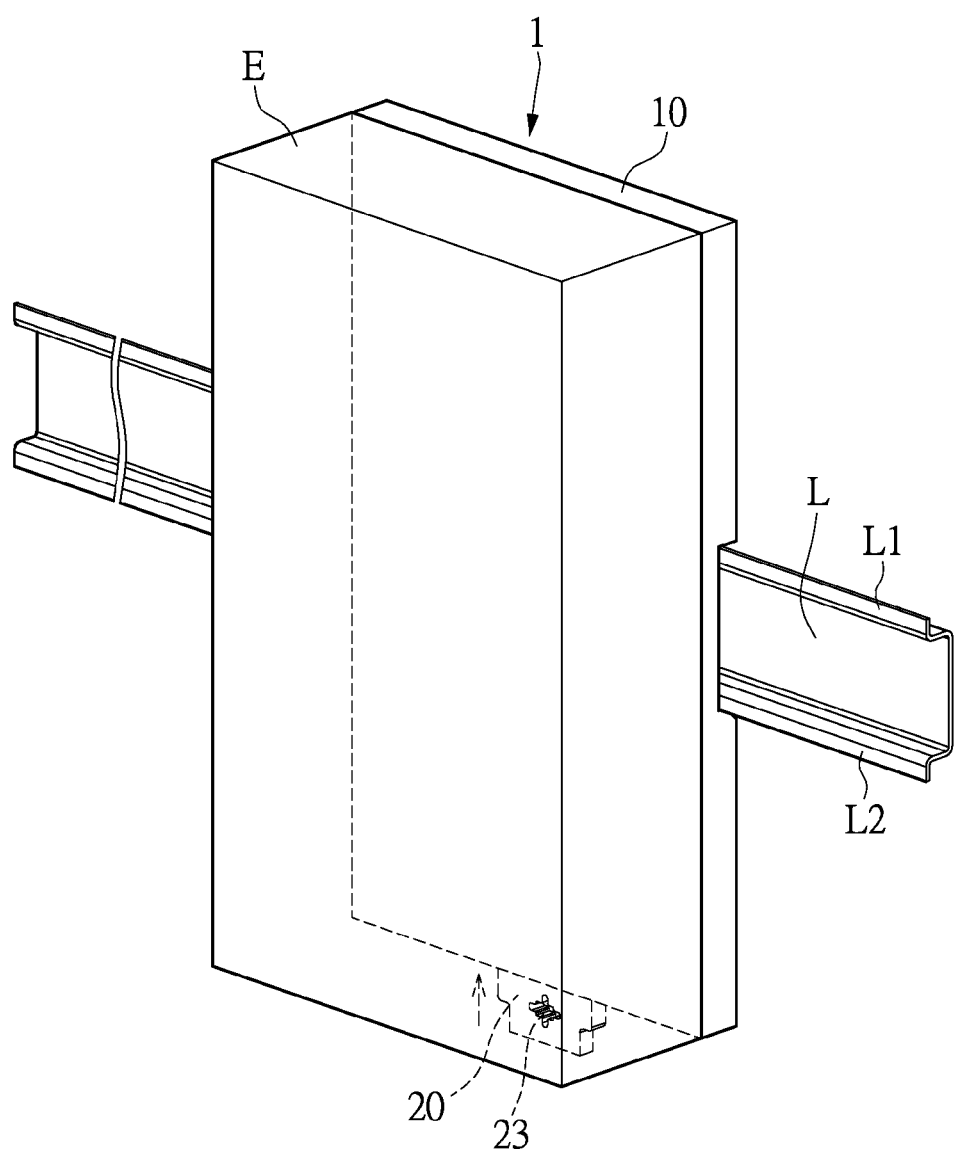
FIG. 9 shows a perspective view of a mounting mechanism suspended on a rail in a housing according to the present disclosure.
Figure 10:
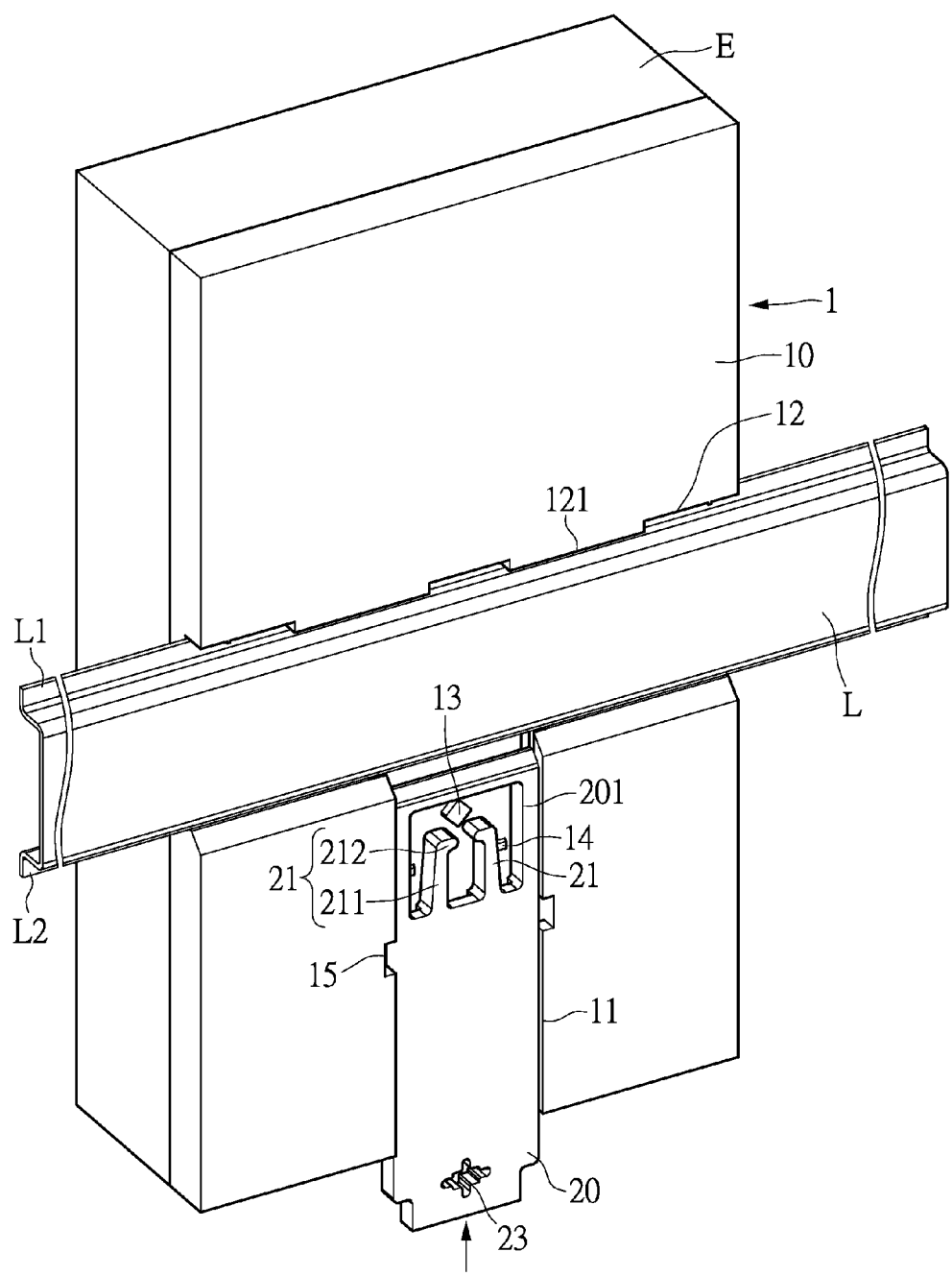
FIG. 10 shows a perspective view of a mounting mechanism suspended on a rail in a housing according to the present disclosure from another perspective.

FIG. 8 to FIG. 10 show a mounting mechanism 1 holding a control equipment E latched onto one of the DIN rails L inside the housing 2. Specifically, the user can first push and pull the latching body 20 of the mounting mechanism 1 holding the control equipment, such that one end of the latching body 20 does not protrude into the second mounting portion 12, and the user can directly suspend the mounting mechanism on the DIN rail L of the housing 2. For example, the user can first snap the side of the second mounting portion 12 having the fixing member 121 to a first rail wall L1 of the DIN rail L, and then use the point of engagement between the mounting mechanism 1 and the first rail wall L1 as a fulcrum to turn the mounting mechanism 1 until the other side of the second mounting portion 12 snaps to a second rail wall L2 of the DIN rail L, such that the control equipment E held by the mounting mechanism 1 is suspended on the DIN rail L of the housing 2. FIG. 9 and FIG. 10 show the control equipment E held by the mounting mechanism 1 suspended on the DIN rail L of the housing 2. At this moment, the latching body 20 of the mounting mechanism 1 does not extend into the second mounting portion 12, so the mounting mechanism 1 is free to move along the DIN rail L.

Of particular note, as shown in FIG. 6, after the user has installed the snap unit 20 into the first mounting portion 11 of the mounting mechanism 1, one end of the latching body 20 protrudes into the second mounting portion 12 and the hook-engaging portion 212 of each of the resilient portions 21 is arranged at the side of the stopper member 13 facing the second mounting portion 12. At this moment, the user can, through pushing or pulling, move the latching body 20 downward (in the direction indicated by the arrow in the figure), such that the hook-engaging portion of each of the resilient portions 21 is pressed by the stopper member 13 and expands outward (toward the two opposite lateral sides of the latching body 20), thereby causing the hook-engaging portion 212 of each of the resilient portions 21 to pass over the stopper member 13 and be positioned at the other side thereof, such that the end of the latching body 20 which was protruding into the second mounting portion 12 is contracted into the first mounting portion 11.

Figure 11:
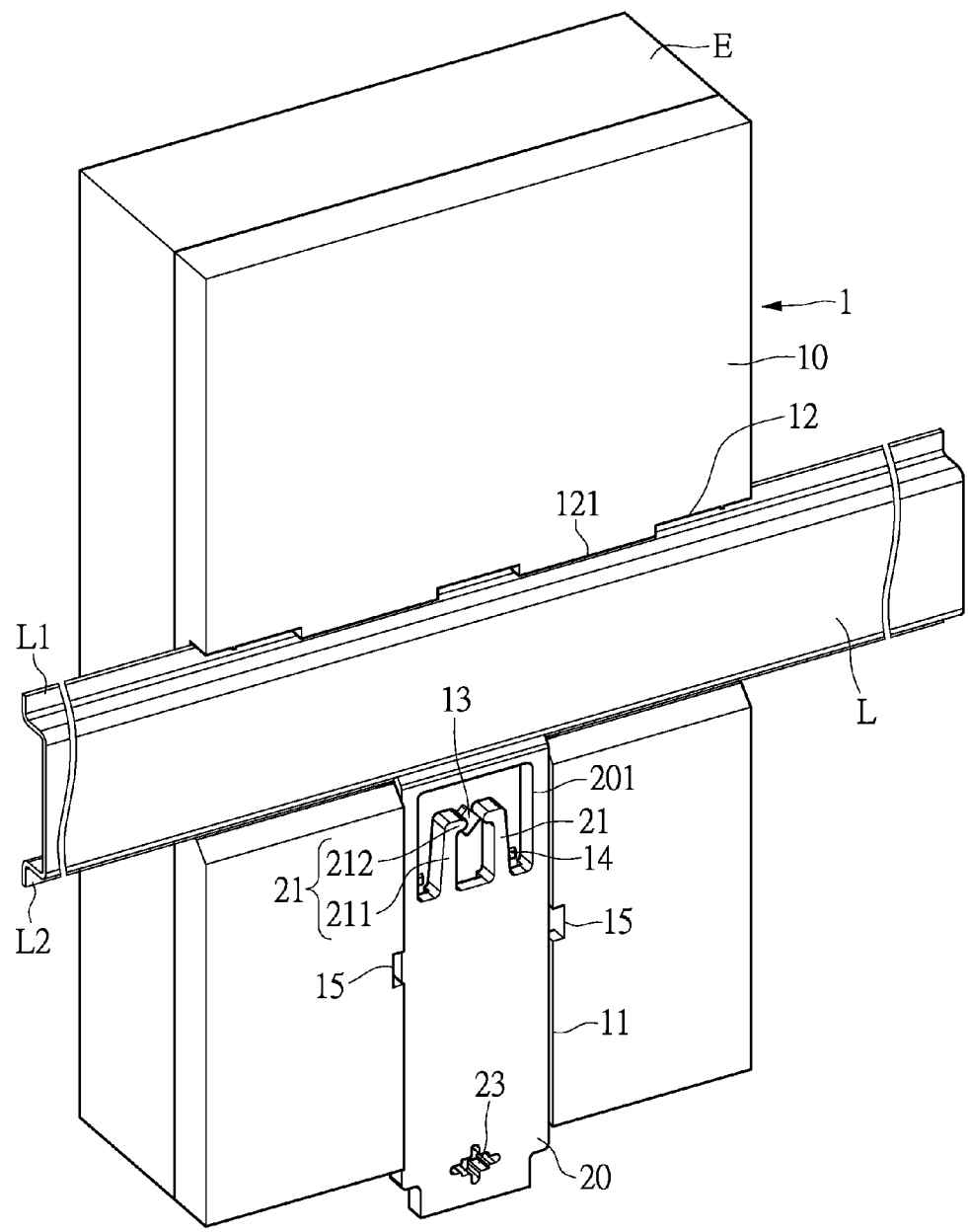
FIG. 11 shows a perspective view of a mounting mechanism latched onto a rail in a housing according to the present disclosure.

As shown in FIG. 10 and FIG. 11, in order for the control equipment E held by the mounting mechanism 1 to be fixed at a specific location on the DIN rail L, the user can push the latching body 20 of the mounting mechanism 1. For example, the latching body 20 can be pushed in the direction shown by the arrow in FIG. 9 and FIG. 10, such that one end of the latching body 20 protrudes into the second mounting portion 12. The end of the latching body 20 protruding into the second mounting portion 12 abuts the second rail wall L2 of the DIN rail L, such that the mounting mechanism 1 can be fixedly latched to a specific location on the DIN rail L.

Figure 12:
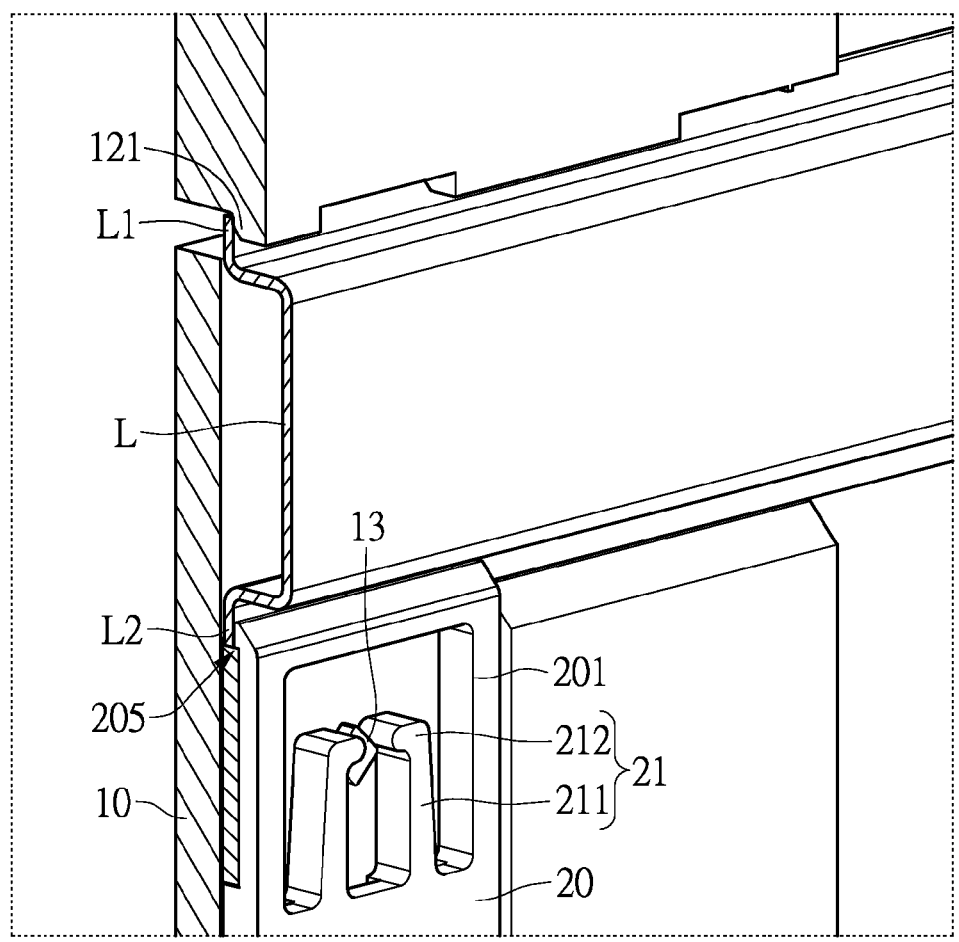
FIG. 12 shows a cross-sectional view of a mounting mechanism latched onto a rail in a housing according to the present disclosure.

Specifically, as shown in FIG. 12, when the mounting mechanism 1 is latched onto the DIN rail L, the fixing member 121 of the second mounting portion 12 of the mounting mechanism 1 is engaged to the first rail wall L1 of the DIN rail L, and the end of the latching body 20 of the mounting mechanism 1 protruding into the second mounting portion 12 is formed with a receding portion 205 (refer to FIG. 2) and is engaged to the second rail wall L2 of the DIN rail L. Namely, the mounting mechanism 1 is fixed to a specific location on the DIN rail L through the fixing member 121 of the second mounting portion 12 and the receding portion 205 at the end of the latching body 20 protruding into the second mounting portion 12. The shape of the receding portion 205 preferably corresponds to the shape of the second rail wall L2, but is not limited thereto in practice.

Of particular note, referring to FIG. 10, when the latching body 20 is pushed upward (the direction shown by the arrow in FIG. 10), the hook-engaging portion 212 of each of the resilient portions 21 is pressed by the stopper member 13 and expands outward, such that the hook-engaging portions 212 pass over the stopper member 13 and move to the other side thereof, thereby causing one end of the latching body 20 to protrude into the second mounting portion 12. As shown in FIG. 11, when one end of the latching body 20 protrudes into the second mounting portion 12, each of the hook-engaging portions 212 of the resilient portions 21 of the latching body 20 abut the other side of the stopper member 13 (the side opposite to the side which the hook-engaging portions 212 are positioned at in FIG. 10), thereby restricting the latching body 20 from sliding downward such that the end of the latching body 20 is kept to be protruding into the second mounting portion 12. Through the designs of the stopper member 13 and the hook-engaging portions 212, the length of the protrusion of the latching body 20 into the second mounting portion 12 can be determined, thereby determining the pressing force applied to the second rail wall L2 by the latching body 20 protruding into the second mounting portion 12. In other words, through the interaction between the hook-engaging portions 212 of the latching body 20 and the stopper member 13, the position of the latching body 20 can be restricted such that one end of the latching body 20 can be kept to be protruding into the second mounting portion 12, and the force applied to the second rail wall L2 of the DIN rail L by the end of the latching body 20 protruding into the second mounting portion 12 can be determined.

Figure 13:
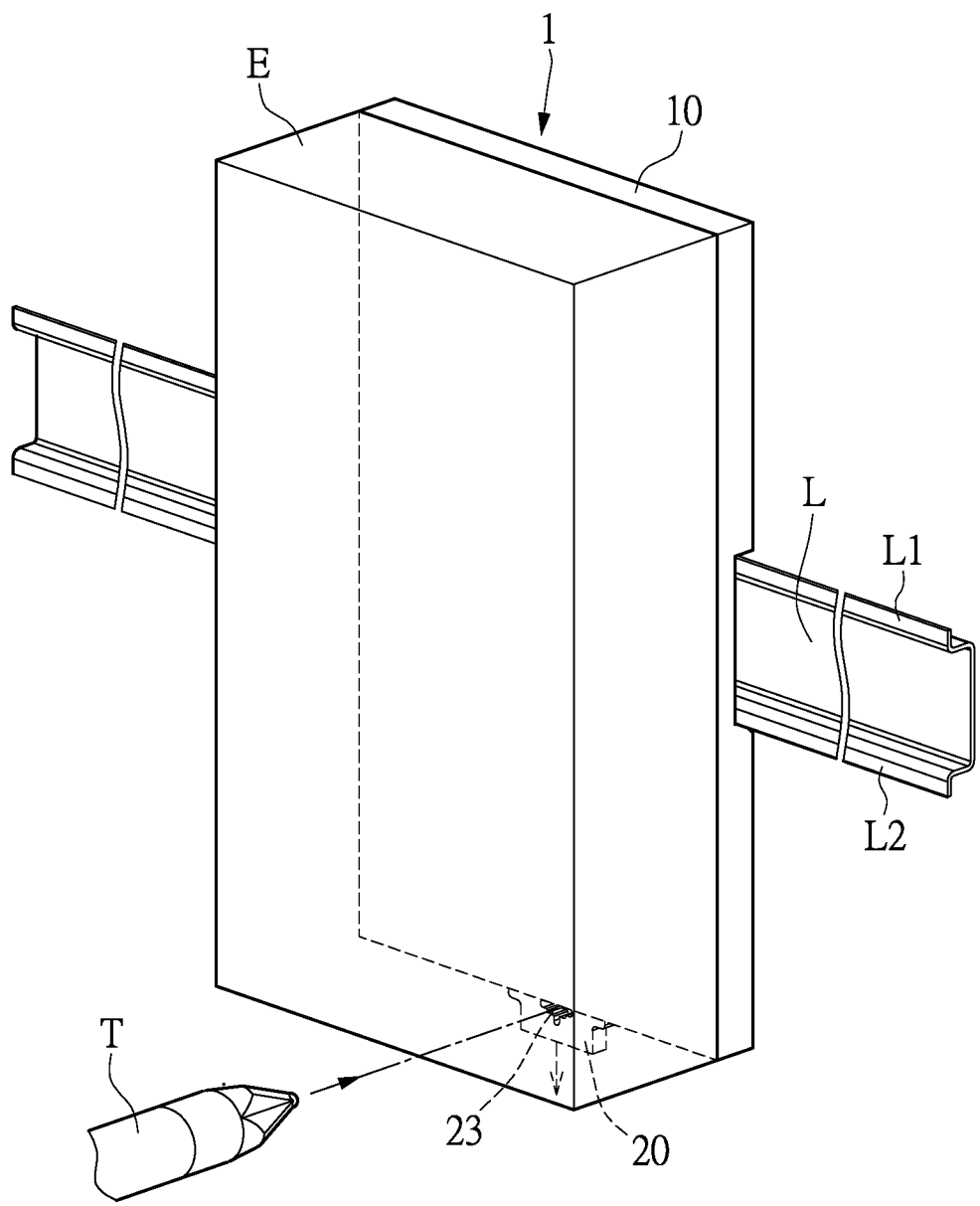
FIG. 13 shows a schematic diagram of an operation for removing a mounting mechanism from a rail of a housing.

As shown in FIG. 13, when the user intends to remove the control equipment E held by the mounting mechanism 1 fixed at a specific location on the DIN rail L, an operation tool T can be inserted into the operation hole 23 of the latching body 20 exposed outside the mounting mechanism 1, and the latching body 20 is moved downward (in the direction shown by the arrow in the figure, away from the second mounting portion 12), such that one end of the latching body 20 contracts into the first mounting portion 11 (as shown in FIG. 10) and no longer abuts the second rail wall L2 of the DIN rail L, such that the mounting mechanism 1 is suspended on the DIN rail L and can freely slide thereon. At this moment, the user can easily remove the mounting mechanism 1 from the DIN rail L. Preferably, the operation hole 23 is as shown in the figures, and has an inner wall which has the shape of an inverse polygon, such that a typical tool such as a slotted, Phillips or hex screwdriver can be easily applied thereto, increasing the convenience of removing the latching body 20. In summary of the above, through the interactions of the first assembly units 15 and the first retaining units 14 of the main body 10, and the second assembly unit 24 and the second retaining units 22 of the latching body 20, the latching body 20 can be quickly and accurately disposed in the first mounting portion 11. Through the abuttal between the resilient portions 21 of the latching body 20 and the stopper member 13 of the main body 10, and the abuttal between the second retaining units 22 of the latching body 20 and the first retaining units 14 of the main body 10, the latching body 20 is effectively restricted to move in the first mounting portion 11, thereby preventing the latching body 20 from sliding out of the first mounting portion 11. Moreover, through the abuttal and pressing between the hook-engaging portions 212 of the latching body 20 and the stopper member 13, one end of the latching body 20 can be selectively exposed in the first mounting portion 11, to selectively fix the main body 10 onto the DIN rail L of the housing 2. Namely, the user only needs to simply push or pull the latching body 20, and the main body 10 can be fixed to or unfixed from the DIN rail L of the housing 2. Additionally, the operation hole 23 of the latching body 20 has an inner wall whose shape is an inverse polygon, such that the user can use a typical tool such as a slotted, Phillips or hex screwdriver to insert into the operation hole 23 and quickly move one end of the latching body 20 out of the second mounting portion 12, such that the main body 10 is removed from the DIN rail L of the housing instead of fixed thereto.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A mounting mechanism, adapted to grip a DIN rail, comprising:
    a main body including a first mounting portion and a second mounting portion, wherein the first mounting portion has a stopper member and two first retaining units; and
    a latching body movably disposed in the first mounting portion and including at least one resilient portion and two second retaining units; wherein one end of the latching body is configured to protrude into the second mounting portion; a range of movement of the latching body in the first mounting portion spans from a first position wherein the resilient portion is positioned below the stopper member to a second position wherein the second retaining units engage the two first retaining units;
    wherein the main body is adapted to movably grip the DIN rail by the second mounting portion and to be fixed to a third position on the DIN rail by one end of the latching body protruding into the second mounting portion,
    wherein a position of the stopper member is more proximal to the second mounting portion than a position of the first retaining unit to the second mounting portion;
    wherein the two first retaining units are arranged symmetrically, the two second retaining units adapted to receive the two first retaining units in the second position, and the two second retaining units are each arranged on the latching body facing the face of the first mounting portion having the two first retaining units;
    wherein the stopper member and the two first retaining units are each a protruding block protruding from the first mounting portion, the latching body is formed with two first guiding grooves that receive the two first retaining units when the latching body is positioned between the first position and the second position and a second guiding groove configured to receive the stopper member, each of the first guiding grooves and the second guiding groove is open at one end and closed at the other end, and each of the second retaining units are recesses arranged at the respective closed ends.

2. The mounting mechanism according to claim 1, wherein the main body has at least one first assembly unit, the latching body has at least one second assembly unit corresponding to the first assembly unit, and through the engagement between the second assembly unit and the first assembly unit of the main body, the latching body is movably disposed in the first mounting portion of the main body.

3. The mounting mechanism according to claim 2, wherein the main body has two first assembly units arranged symmetrically on two respective opposite sides of the first mounting portion, and the two corresponding lateral sides of the latching body are formed respectively with two second assembly units.

4. The mounting mechanism according to claim 3, wherein each of the first assembly units is an indentation or a protrusion, and each of the second assembly units is correspondingly a protrusion extending outward from one of the lateral sides of the latching body or an indentation recessed from one of the lateral sides of the latching body.

5. The mounting mechanism according to claim 4, wherein when each of the second assembly units is engaged to the respective first assembly unit, the second retaining units are respectively engaged to the first retaining units at the same time.

6. The mounting mechanism according to claim 1, wherein when one end of the latching body protrudes into the second mounting portion, the other end of the latching body is exposed outside the first mounting portion and is formed with an operation hole.

7. The mounting mechanism according to claim 6, wherein the shape of the inner wall of the operation hole is an inverse polygon.

8. The mounting mechanism according to claim 7, wherein the main body has at least one first assembly unit, the latching body has at least one second assembly unit corresponding to the first assembly unit, and through the engagement between the second assembly unit and the first assembly unit of the main body, the latching body is movably disposed in the first mounting portion of the main body.

9. The mounting mechanism according to claim 8, wherein the main body has two first assembly units arranged symmetrically on two opposite respective sides of the first mounting portion, and the two corresponding lateral sides of the latching body are formed respectively with two second assembly units.

10. The mounting mechanism according to claim 9, wherein each of the first assembly units is an indentation or a protrusion, and each of the second assembly units is correspondingly a protrusion extending outward from one of the lateral sides of the latching body or an indentation recessed from one of the lateral sides of the latching body.

11. The mounting mechanism according to claim 10, wherein when each of the second assembly units is engaged to the respective first assembly unit, the second retaining units are respectively engaged to the first retaining units at the same time.

* * * * *